Feb. 6, 1951 P. M. ARNOLD 2,540,977
CONTINUOUS FRACTIONAL CRYSTALLIZATION PROCESS
Filed Jan. 2, 1945 2 Sheets-Sheet 1
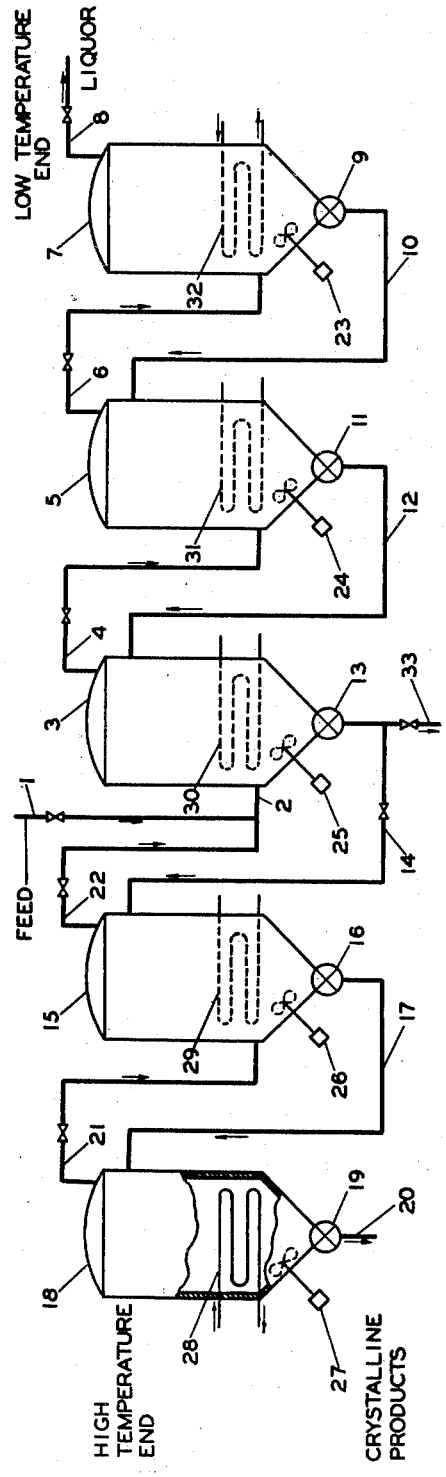
FIG. I
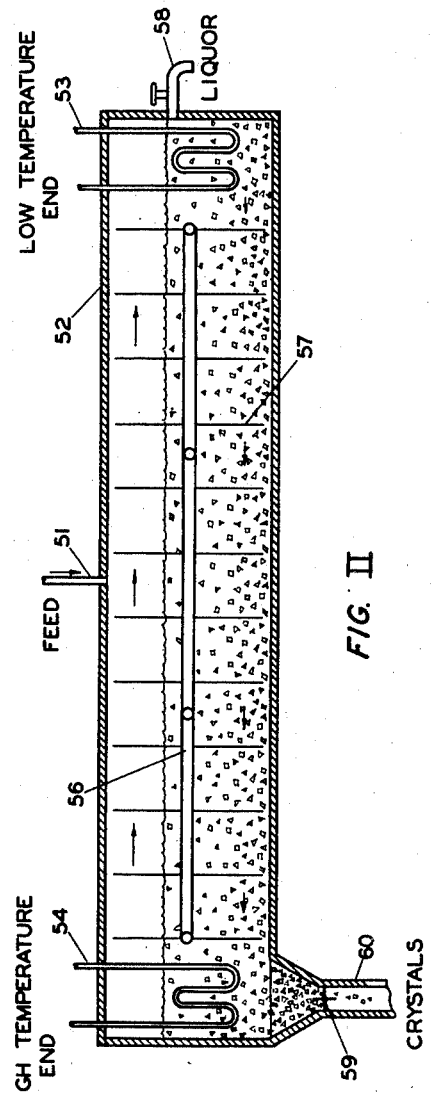
FIG. II
INVENTOR
P. M. ARNOLD
BY Hudson & Young
ATTORNEYS Feb. 6, 1951 P. M. ARNOLD 2,540,977
CONTINUOUS FRACTIONAL CRYSTALLIZATION PROCESS
Filed Jan. 2, 1945 2 Sheets-Sheet 2
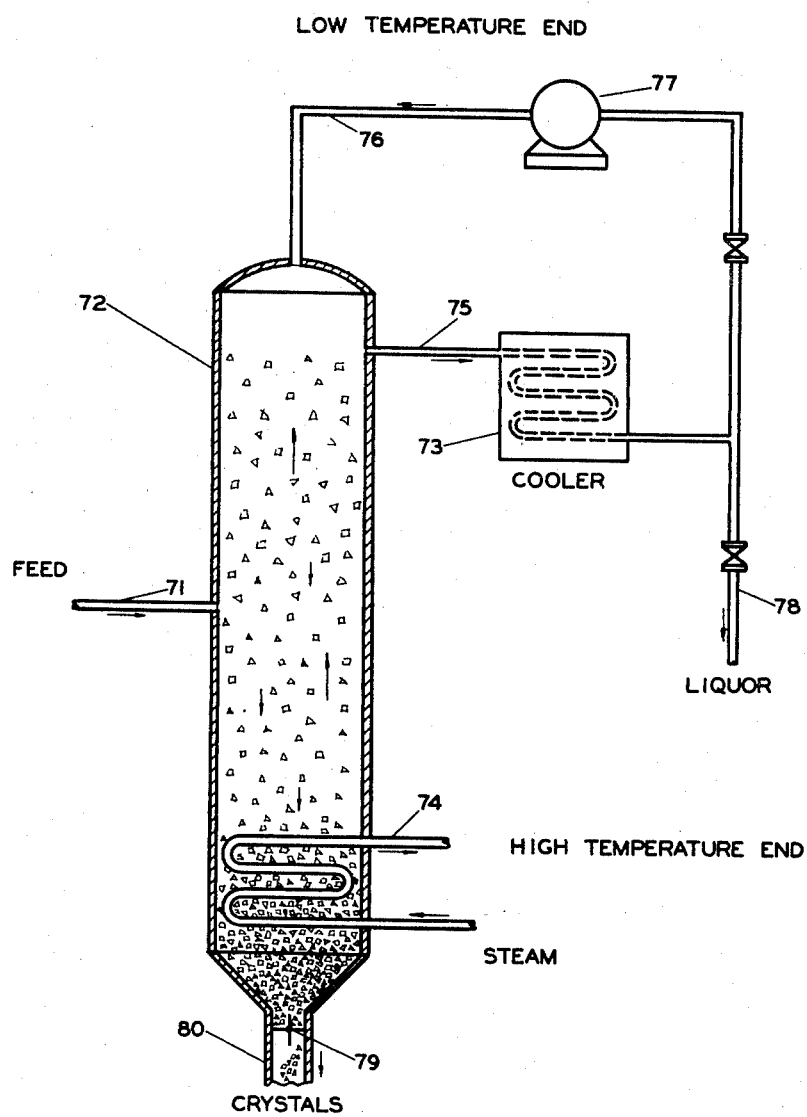
FIG. III
INVENTOR
P. M. ARNOLD
BY Hudson and Young
ATTORNEYS Patented Feb. 6, 1951

2,540,977

UNITED STATES PATENT OFFICE 2,540,977

CONTINUOUS FRACTIONAL CRYSTALLIZATION PROCESS

Philip M. Arnold, Bartlesville, Okla., assignor to Phillips Petroleum Company, a corporation of Delaware Application January 2, 1945, Serial No. 571,073

9 Claims. (Cl. 260—666)

This invention relates to the separation of components of a multicomponent system. More particularly this invention relates to the separation and purification of mixtures by crystallization. In one embodiment, the invention relates to the separation and purification of the components of a two component system by a continuous fractional crystallization process.

In many industrial applications, chemical compounds are separated by means of crystallization where separation by distillation is impracticable or impossible. Separation by crystallization is very advantageous when dealing with materials which have relatively high boiling ranges or with substances which are thermally unstable, or with solutions containing both volatile and nonvolatile impurities or undesired constituents.

It is possible in some instances to obtain one component of a solution in the desired degree of purity through a single crystallization. In other instances, the mutual solubility relationships of the components of a multi-component system may be such that a fractional crystallization process is required. Theoretically only one crystallization should be required because crystals separating from a solution are presumed to have a definite composition. Practically, however, since crystals obtained from a solution of several components will be impure, more than one crystallization is necessary to obtain pure crystals. The impurity of these crystals and consequent variance in chemical composition is the result of the occlusion of solvent and other solutes within the crystals and the adsorption of these same contaminants on the surface of the crystals. In conventional fractional crystallization the crystal yield from one batch crystallization is redissolved in a solvent or remelted and again crystallized to effect further purification. The recrystallized product will have less impurity since the concentration of impurity in the new liquor is less than in the previous liquor of crystallization.

For example, the separation and purification of the two components of a two component system is achieved in a batch-wise manner by several crystallization and recrystallization processes. As the first step, the original liquor is cooled and crystals which are richer in one of the components are separated by partial crystallization of the liquor. These crystals are removed to another vessel where they are melted. As the second step of the batch process, another partial crystallization of the remelted crystals is performed giving crystals which are richer in the desired component than those crystals of the first crystallization. This process of remelting the crystals and partial recrystallization may be continued until crystals of the desired purity are obtained. The remaining liquor from the first step of the crystallization may also be subjected to another partial crystallization, thereby producing a liquor having still less of the other component than the original liquor. The partial crystallization of the liquor may be continued until the desired purity of liquor is obtained. Crystals and liquor of intermediate impurity may be recycled to the first crystallization step or subjected to further crystallization to obtain products of the desired purity.

Each crystallization step of such a fractional crystallization process is a batch operation within itself, from which crystals and liquor are subjected to a separate recrystallization or crystallization. However, the crystallization process within any particular step may be a continuous one; that is crystals of that step are continually formed and liquor is continually fed in and taken out. In multicomponent systems where it is desired to recover more than one component in the pure form it is necessary first to separate the components in the impure state by one step or series of steps, then in a different step or series the impure components are purified by washing, melting or recrystallization.

These processes described require a large amount of equipment and floor space for their operation. Furthermore, labor and equipment costs in a batch process account for a substantial portion of the operating costs of the process. It is much to be desired to employ a true continuous process to substantially decrease the equipment and maintenance costs while maintaining the desired capacity.

It is the primary object of this invention to provide a continuous process for the separation of multicomponent mixtures.

Another object of this invention is to provide a process for the separation of multicomponent systems by fractional crystallization.

A further object of this invention is to provide a process for separation and purification of high-boiling hydrocarbons and hydrocarbons which are thermally unstable.

It is still a further object of this invention to provide a continuous purification process.

It is also an object of this invention to decrease the cost of maintenance and equipment for crystallization processes.

Still another object is to increase the capacity and output in the separation of the various components of a mixture by a continuous fractional crystallization process.

Other objects and advantages will appear obvious to those skilled in the art from the following disclosure.

The present invention comprises a continuous fractional crystallization process wherein at least one component of a multicomponent system is simultaneously separated and purified. In an application of this process, a multicomponent solution or slurry passes from a high-temperature zone to a zone of relatively lower temperature under conditions of saturation to form crystals of at least one of the components. These crystals pass by virtue of their relative density or by mechanical means from the low-temperature zone to the relatively-high-temperature zone countercurrently to the saturated solution and the purified crystals are discharged from the high-temperature zone as a product. Liquor which may also be a desired product is discharged from the low-temperature zone. The temperature change from one zone to the other is gradational and represents the crystallization temperature of a solution of a particular composition at any particular point intermediate the two zones. The feed liquor or solution normally enters the continuous fractional crystallization system at a point intermediate the maximum and minimum temperature zones. The process is conveniently carried out in either a series of continuous crystallizers or in a single continuous vertical tower or horizontal tank.

The novel process of this invention is applicable to the separation of multicomponent mixtures as well as to two component mixtures. It is particularly applicable to the separation of hydrocarbons having close boiling points but having freezing points substantially different. In the case of hydrocarbons the normal manner of separation by stripping or distillation sometimes requires high temperatures which is undesirable because many hydrocarbons are thermally unstable at these high temperatures. Thus, the separation of certain hydrocarbon mixtures by distillation or the like is practically impossible. In other cases the boiling points of the hydrocarbons may be so high that their distillation at these high temperatures is uneconomical. This invention is also applicable to inorganic mixtures as well as organic mixtures and constitutes a convenient method of separating two inorganic components between which solvates or hydrates are formed. For purposes of simplicity the discussion will be limited primarily to the separation of two component systems.

The drawing of Figure I is a diagrammatic illustration of apparatus which may be used for carrying out one embodiment of this invention comprising the separation of two components in a series of crystallizers interconnected for continuous crystallization. The flow of the crystals formed in the crystallizers is countercurrent to the flow of the liquid between the separate crystallizers. The liquid flows from a high-temperature crystallizer to a crystallizer at a lower temperature while the crystals pass from a low-temperature crystallizer to a crystallizer at a higher temperature, countercurrently to the flow of the liquid. For the optimum operation of the process, the liquid mixture in each crystallizer should be substantially at its saturation condition in respect to crystals. This condition of saturation will depend upon the temperature and composition of the mixture in each crystallizer and thus requires the regulation of the temperature therein to correspond to the saturation of the liquid mixture of that particular composition. Materials comprising the separated components are withdrawn from both the highest-temperature crystallizer and the lowest-temperature crystallizer in the series. As contained herein, saturated conditions refer to conditions of equilibrium between solids and liquids.

In operation for separation of a two component mixture in the series of crystallizers of Figure I, the feed mixture enters crystallizer 3 through lines 1 and 2. The temperature of crystallizer 3 is maintained by heat exchanger 30 so that the liquid mixture within the crystallizer is at its crystallization temperature, i. e., in a saturated or super-saturated condition in respect to the formation of crystals. In this manner crystals may be formed in crystallizer 3. Liquid from crystallizer 3 is continuously withdrawn through line 4 to a crystallizer 5 in which the liquid mixture has a lower temperature than in crystallizer 3 and is at a saturated condition with respect to crystals present therein. Simultaneously crystals are continuously withdrawn from crystallizer 3 through star valve 13 into line 14 for introduction into crystallizer 15 in which the mixture is at a higher temperature than in crystallizer 3 and is also in a saturated condition with respect to crystals present therein. Circulation and mixing of crystals and liquid in crystallizer 3 may be obtained, as desired, by stirrer 25 so that intimate contact is made between crystals and saturated liquid and to maintain a relatively uniform temperature therethrough. Temperature conditions are maintained in crystallizer 5 by heat exchanger 31, which may either heat or cool the liquid in crystallizer 5 depending upon the saturation temperature required and gain or loss of heat at other parts of the crystallizer. Stirrer 24 maintains adequate mixing of both liquid and crystals in crystallizer 5. Saturated liquid passes from crystallizer 5 into a lower-temperature crystallizer 7. The liquid mixture is maintained at saturated conditions in crystallizer 7 and the temperature is maintained sufficiently low to assure the continual formation of crystals therein. The temperature of crystallizer 7 is maintained by a heat-exchange means 32 in crystallizer 7. Mixing of liquid and the crystals and the maintenance of uniform temperature is aided by stirrer 23. A substantially pure liquid comprising one component of the original mixture is withdrawn by line 8 as a product of the process. The crystals comprising the other component of the mixture are discharged from crystallizer 7 through star valve 9 into line 10 and are conveyed to crystallizer 5 countercurrent to the flow of the liquid from crystallizer 5. The crystals from crystallizer 7 are intimately mixed with saturated liquid in crystallizer 5 and resulting crystals are withdrawn through star valve 11. These crystals are then conveyed through line 12 to crystallizer 3 where they are again intimately mixed with the saturated liquid mixture therein, and again the resulting crystals are withdrawn through star valve 13 into line 14. The crystals from line 14 are introduced into crystallizer 15 where the crystals are mixed with a saturated liquid having a higher temperature than the liquid of the previous crystallizer. The temperature within crystallizer 15 is maintained by heat exchanger 29 within the crystallizer. Circulation of the liquid and crystals is aided by stirrer 26. Liquid is withdrawn from crystallizer 15 through line 22 and enters line 2 and crystallizer 3. Crystals from crystallizer 15 are discharged through star valve 16 into line 17 and conveyed into crystallizer 18. Crystallizer 18 is at a higher temperature than the previous crystallizers and the liquid within the crystallizer is also substantially at a saturated condition. The temperature is maintained by heat exchanger 28 within the crystallizer. Stirrer 27 maintains mixing of crystals and liquid. The final crystals comprising one component of the mixture are withdrawn through star valve 19 and line 20 as a product of the process. The liquid from crystallizer 18 passes to crystallizer 15 through line 21.

It should be noted that the crystals form at the low temperature end of the series of crystallizers and pass countercurrently to the liquid to a higher temperature crystallizer and are withdrawn as a product from the high temperature end of the series of crystallizers. The liquid mixture, on the other hand, flows under substantially saturated conditions from the high temperature end to the low temperature end of the series of crystallizers. Liquid is withdrawn from the low temperature end of the crystallizer. A portion of the liquid may be recycled to the feed.

Crystals formed in crystallizer 7, the lowest temperature crystallizer, have the maximum amount of the other component contained in them as an impurity. These crystals, when placed in crystallizer 5 at a higher temperature but under saturated conditions, are partially dissolved or remelted; the most impure crystals dissolving and the least impure crystals remaining undissolved. New crystals may form in crystallizer 5 which correspond to the purity of the crystals remaining undissolved from crystallizer 7. In addition, the crystals remaining undissolved may grow in size by the crystallization taking place on the surface of the crystals. When the crystals from crystallizer 5 are introduced into crystallizer 3 which is at a still higher temperature than crystallizer 5, the more impure crystals are dissolved as before and the least impure crystals remain undissolved. It is not essential, however, to the operation of this process that crystals form in any of the crystallizers except crystallizer 7 which has the lowest temperature. The other crystallizers may serve merely to maintain equilibrium between crystals and liquid so that the more impure crystals tend to dissolve. This will result in the purest crystals being discharged from crystallizer 18, the last crystallizer. The group of crystallizers between the feed and the low-temperature end of the series of crystallizers acts in two ways: as a continuous crystallizer (formation of crystals) and as a continuous purifier (dissolving impure crystals).

The crystals withdrawn from crystallizer 3 and introduced into crystallizer 15 are partially redissolved or melted, the most impure crystals redissolving and the more pure crystals remaining undissolved. This same function is also performed by crystallizer 18. The crystals withdrawn from this last or high temperature crystallizer are the purest crystals obtainable. Their purity will depend essentially upon the number of crystallizers used. These crystallizers between the feed inlet and the highest temperature end of series serve primarily as a purification means rather than as crystallizing means because few if any crystals are formed in them.

The impurity contained or absorbed on the surface of the crystals will comprise the other component or components of the mixture. It is the tendency of the impure crystals to redissolve or remelt at lower temperatures of saturation than pure crystals which accounts for the impure crystals rather than the pure crystals redissolving. It is essential that the liquid mixture in each of the various crystallizers should be under substantially saturated conditions at its respective temperature so that only the impure crystals are redissolved.

The crystals discharged from the crystallizers may be filtered to separate the liquid entrained in them. However, filtration is not always necessary since the crystals are continuously washed in the next crystallizer into which they are introduced. In most crystallization processes filtering is essential to completely separate crystals and liquid. Also it is often necessary that the crystals be washed free of any contaminating liquid. However, in the present process these two features are incorporated in a continuous operation so that the crystals withdrawn as a product have been washed and separated from the other component of the mixture so that the crystals are essentially free from the other component. Thus, in the normal application of the present invention, no filtering of the final product is necessary.

The crystals themselves may be conveyed from one crystallizer to the other in any convenient manner such as by screw conveyors, belt conveyors, or conduits. By placing a lower temperature crystallizer above a higher temperature crystallizer crystals may be conveyed from one crystallizer to the other by gravity and countercurrent to liquid being pumped to the other crystallizer.

In case of a multicomponent system crystalline products of different components may be withdrawn from the intermediate crystallizers as well as the end crystallizers. Thus, a crystalline product may be withdrawn from the high temperature end of the series of crystallizers and also one or more crystalline products may be withdrawn from the crystallizers intermediate the high and low temperature extremes of the series, such as from crystallizer 3 through line 33. In operation if a crystalline product is withdrawn from crystallizer 3 a portion of the crystals will continue to pass to crystallizer 15, and so on, and another crystalline product will be withdrawn from crystallizer 18. The liquid which is withdrawn from the low temperature end of the crystallizers may also comprise one of the desired products of the process.

The drawing of Figure II illustrates an apparatus for the operation of another modification of the present process. The crystallization is carried out in a horizontal vessel with mechanical means for transporting crystals from the low temperature to the high temperature end of the vessel. Thus, horizontal vessel 52 comprises a closed trough with a semicylindrical bottom having a conveyor means 56. One end of the vessel contains closed conduit 53 for introducing a medium for maintaining a relatively low temperature, and the other end contains closed conduit 54 for introducing a medium for maintaining a relatively high temperature.

In operation, a feed mixture is introduced through line 51 into vessel 52. The liquid mixture flows horizontally to the low-temperature end of said vessel and is discharged through outlet 58. Crystals are formed at the low-temperature end of the vessel and are conveyed countercurrent to the flow of liquid to the high temperature end of said vessel. Conveyor 56 may comprise a chain, or a belt with paddles 57. These paddles are perforated or made of a screen so that liquid flows through them but the crystals are retained on or by them. In this manner the crystals are moved countercurrent to the liquid by the movement of the paddles on the conveyor. In returning, the paddles are above the liquid and do not interfere with the flow of the liquid within vessel 52. Crystals accumulate in the high-temperature end of the semicylindrical vessel 52 and are withdrawn through star valve 59 and line 60.

Carrying out the process in a single vessel as shown in Figure II embodies the same principles and manner of operation as in the case of a series of crystallizers shown in Figure I. In theory the crystallizers of Figure I may be placed so close together that there are no conduits for transferring the liquid and the crystals between them thus essentially comprising a single vessel as in Figure II. The liquid mixture flows from feed inlet 51 and the high-temperature end of the vessel 52 of Figure II under saturated conditions to the low-temperature end of said vessel and the temperature gradually decreases in the direction of flow. The crystals are formed primarily at the low-temperature end of the vessel but crystals may also form in the saturated mixture between the point of introduction of the feed and the low-temperature end of the vessel. For most satisfactory performance of the process the feed mixture is preferably introduced under saturated conditions at a point in the vessel corresponding to these conditions. The impurities of the crystals comprising the other components of the mixture are redissolved by the liquid mixture as the crystals progress countercurrently to the flow of the liquid in the vessel. The displacement of liquid by the crystals being passed from the low-temperature to the high-temperature end of the vessel at least partially causes the flow of liquid in the opposite direction.

Any suitable type of conveyor may be used for transporting the crystals in the vessel, such as a flat belt conveyor, buckets, or scraping devices. Small screw conveyors in the lower portion of the vessel may also transport the crystals to the opposite end. Conveyance of the crystals to the end of the vessel may also be accomplished by raising the low-temperature end of the vessel so that the vessel slopes; the crystals on falling through the liquid will fall toward the high temperature end. Upon lifting the crystals into liquid again by means of the spiral agitator the crystals again fall in the direction of the high-temperature end of the vessel. In this manner the crystals progress toward the high-temperature end while they are thrown into liquid mixture. In some cases it will be desirable to have a perforated spiral.

Any means of cooling the low-temperature end of the vessel may be used. The actual temperature necessary at the low-temperature end of the vessel will depend upon the particular mixture from which crystals are formed. In some cases cooling water may be used and in other cases refrigerants such as propane or ammonia may be necessary. In a similar manner various means may be used to heat the high-temperature end of the vessel. In some instances steam or hot water may be used, in others super-heated steam or gases may be necessary to maintain the appropriate temperature.

The drawing of Figure III is a similar embodiment of the process as that of Figure II, however, the vessel is constructed in a vertical position rather than in a horizontal position. The vessel 72 is completely filled with liquid, the liquid passing upward and the crystals passing downward by virtue of their relative densities. In operation a feed mixture enters vessel 72 through line 71 and passes upward. Upon progression of the liquid mixture toward the top of the tower crystals are continuously formed. A liquid essentially free from the component forming the crystals, is withdrawn from the top of vessel or column 72 through line 75 and enters cooler 73. A portion of the liquid is recirculated through line 76 and pump 77, the remaining portion being withdrawn through line 78. Crystals falling through the liquid mixture in column 72 accumulate at the bottom and are withdrawn through star valve 79 and line 80 as a product of the process. The bottom of the column 72 is maintained at a substantially higher temperature than the top of the column by means of heater 74. The liquid mixture within vessel 72 is saturated and the temperature of the liquid mixture gradually decreases from the bottom to the top of the tower. As in the previous embodiments of this invention, additional products may be withdrawn at points intermediate the top and bottom of column 72 depending upon the composition of the mixture and saturation conditions of the various components of the mixture.

In some applications of this process the high-temperature zone will be at the top of the tower and the low-temperature zone will be at the bottom of the column. This will not always be the arrangement, of course, but will depend upon the characteristics of the various components of the mixtures. In those cases where the high-temperature zone is at the top of the column, the crystals must be conveyed by mechanical means such as by bucket type conveyors or the like to the top and discharged from the tower.

In general, the component of the lower freezing point will be concentrated at the low-temperature end of the vessel and the component having the higher freezing point will be collected at the high-temperature end of the vessel. In some cases when dealing with substances having negative temperature coefficients of solubility it may be necessary to gather the crystals at the low-temperature end of the vessel and to concentrate the liquid at the high-temperature end of the vessel. In the majority of cases, however, crystals will be collected at the high-temperature end of the vessel. It may be desirable in some cases to maintain sufficiently high temperature to melt the crystals at the high-temperature end of the vessel enabling their withdrawal as a liquid.

Whether a vessel is maintained in a horizontal or vertical position will often depend upon the specific gravities of the components being separated, and in some cases when the crystals have a greater density than any part of the liquid from which they are being separated it may be entirely possible to operate the process without mechanical means for moving the crystals from the cold end to the warm end. By proper design of the apparatus centrifugal force may be used to supplement or replace gravity.

Where nucleation does not readily occur a tendency toward the formation of supersaturated solutions at the low-temperature end of the crystallizer will exist. If supersaturation occurs crystals may form on the surface of the cooling means and tend to interfere with heat transfer and removal of the crystals to the high temperature end of the vessel. A suitable scraping means will overcome this difficulty by assuring that crystals are continuously scraped from the surface of the cooling means.

The crystals and liquid mixture within the vessel or the series of crystallizers are at all times substantially at equilibrium under the particular conditions of temperature and composition. To accomplish such equilibrium the temperature between the high temperature and the low temperature must be gradational and be of such an amount as to correspond to the saturation temperature of the particular mixture at any particular point. Under normal conditions the system itself will acquire this gradational temperature and equilibrium phenomenon by virtue of the crystals moving countercurrently to the liquid from a low-temperature to a high-temperature zone. At each end of the vessel the composition of the mixture is extremely high in one component and extremely low in the other but conditions of saturation still exist.

The flow of liquid in one direction as required by this process is brought about by two factors; one is the introduction of the feed and removal of a liquid and the other is the remelting or redissolving of the crystals and their movement through the liquid mixture in a countercurrent direction displacing liquid which must flow in the opposite direction to the crystals. Only a portion of the crystals are removed, the remainder accumulate and redissolve. This process is applicable to multicomponent mixtures as well as two component systems. Application to multicomponent mixtures, however, would require further adjustment of crystallization conditions and means for withdrawing several crystalline products. In the case of components forming eutectics, the eutectic will be a product of the process.

The vessel or trough used in the application illustrated in Figure II may be an open vessel as well as a closed one. In case the vessel is an open one exposing the surface of the liquid mixture to the atmosphere, the evaporation of the more volatile component may aid in the crystallization and separation of the less volatile components. In many cases therefore it may be desirable to have an open vessel since the evaporation of the more volatile component at the high temperature end of the vessel will concentrate the mixture even more with respect to the less volatile component or component that is being crystallized.

EXAMPLES

A specific example of the use of this fractional crystallization process is in the separation of paraxylene from a mixture including ethyl benzene and ortho- meta-, and paraxylenes.

Table I shows the relation of the freezing points and boiling points of these compounds.

Table I

| | Freezing Point | Boiling Point |
|---|---|---|
| | °C. | °C. |
| Ethylbenzene | −93.9 | 136.2 |
| Metaxylene | −53.6 | 138.8 |
| Orthoxylene | −29 | 144. |
| Paraxylene | +13.2 | 138.5 |

It is apparent from the above table that separation of paraxylene from the complex mixture would be a very difficult problem by fractional distillation, which would require a large number of equilibrium contacts and a high reflux ratio. There is only 0.3° C. difference in the boiling points of metaxylene and paraxylene, and only 2.3° difference in the boiling points of ethylbenzene and paraxylene.

The freezing points of the components, on the other hand, show great differences. Paraxylene freezes 107.1° C. higher than ethylbenzene, 66.8° C. higher than metaxylene, and 42.2° C. higher than orthoxylene. It is thus evident that separation of these compounds would be much simpler by fractional crystallization than by distillation.

Other examples of hydrocarbon mixtures which may be separated by this process are found in the following tables showing their melting and boiling points at atmospheric conditions.

Table II

| | Freezing Point | Boiling Point |
|---|---|---|
| | °C. | °C. |
| Benzene | 5.56 | 80 |
| Toluene | −95 | 110 |

Table III

| | Freezing Point | Boiling Point |
|---|---|---|
| | °C. | °C. |
| Naphthalene | 80.22 | 217 |
| Toluene | −95 | 110 |

Table IV

| | Freezing Point | Boiling Point |
|---|---|---|
| | °C. | °C. |
| Styrene | −30 | 141 |
| Ethylbenzene | −95 | 136 |

Complete separation of the above compounds can be conveniently carried out by the present fractional crystallization process. The present invention is particularly advantageous for separation of organic compounds since the danger of thermal decomposition at temperatures required for their separation by distillation is entirely eliminated.

In the case of the separation of cyclopentadiene and dicyclopentadiene, according to Table V the boiling points of the compounds are sufficiently apart for their separation by distillation. However, in distilling, the dicyclopentadiene decomposes to cyclopentadiene and makes the separation of the compounds impossible. By a fractional crystallization process similar to the present invention, the dicyclo- and cyclopentadiene may be separated and purified without decomposition.

Table V

| | Freezing Point | Boiling Point |
|---|---|---|
| | °C. | °C. |
| Cyclopentadiene | −85 | 41 |
| Dicyclopentadiene | 33 | 170 |

Benzene and dicyclopentadiene are often present in the same hydrocarbon mixture. It is also more or less impossible to separate those compounds by distillation since the dicyclopentadiene decomposes to the cyclopentadiene and the cyclopentadiene thus formed is distilled over with the benzene. (See Tables I and V.) The separation of benzene and dicyclopentadiene can be conveniently effected by the crystallization process of this invention yielding a substantially pure benzene product.

Cyclohexane is often present in isoheptane fractions in concentrations up to about 25 per cent. It is sometimes necessary to separate the heptanes from the cyclohexane, but because of the close boiling points of the compounds such a separation is very difficult. As indicated in Table VI the melting points of the cyclohexane and the isoheptanes are widely separated which consequently allows a good separation to be made by fractional crystallization.

Table VI

| | Freezing Point | Boiling Point |
|---|---|---|
| | °C. | °C. |
| Cyclohexane | 5.86 | 80.8 |
| Isoheptanes | −62 to −136 | 87–99 |

As is illustrated by Table VII below, the separation of neooctane (2,2,3,3-tetramethyl butane) from other octanes can be accomplished with much less difficulty by fractional crystallization than by distillation.

Table VII

| | Freezing Point | Boiling Point |
|---|---|---|
| | °C. | °C. |
| Neooctane (2,2,3,3-tetramethyl butane) | +101 | 106 |
| Other Octanes | <−90 | 105–125 |

Another possible application of the present process of fractional crystallization is the dewaxing of petroleum oils. Separation of waxes from petroleum oils by distillation is practically impossible since the boiling ranges of the waxes and oils are very close. Much of the dewaxing at present, therefore, is accomplished by selective solvent extraction of the waxes. By fractionally crystallizing the waxes by the process of this invention an almost complete separation of waxes and oils can be obtained. The different waxes which have been separated from the oils may be separated from each other and purified by redissolving the waxes in a solvent and subjecting the solution to further fractional crystallization. In this way a petroleum oil can be obtained substantially free of wax, and a purified wax of the desired quality can be recovered from the total wax product.

Three component systems may also be separated by crystallization means in the manner described herein. For example, in the three component system of sodium carbonate, sodium sulfate and water, both sodium carbonate and sodium sulfate may be removed from the solution by crystallization as separate products.

Other systems to which the present invention is applicable and in which separation by crystallization is particularly advantageous are the sodium nitrate-sodium chloride-water system in which the lowering of the temperature decreases the solubility of sodium nitrate and increases the solubility of sodium chloride; and the sodium hydroxide-sodium chloride-water system.

Having described a preferred form of my invention and having pointed out the principal considerations to be observed in the application of the invention to various processes, it is obvious that various modifications can be made without departing from the scope of the invention by one skilled in the art.

I claim:

1. A continuous process for the separation of cyclohexane from an isoheptane fraction containing the same, which comprises continuously passing a liquid mixture including isoheptanes and cyclohexane from a zone of relatively high temperature to a zone of relatively low temperature in an extended separation and purification zone under conditions such that said liquid mixture gradually decreases in temperature; maintaining by indirect heat-exchange a temperature in said zone of relatively high temperature just above the melting point of pure crystals of cyclohexane; maintaining by indirect heat-exchange said zone of relatively low temperature below the solidification point of crystals containing cyclohexane and isoheptane but above the temperature at which the entire mixture solidifies so as to form multicomponent crystals therein; continuously mechanically passing said crystals toward said zone of relatively high temperature so as to gradually increase their temperature and decrease the concentration of isoheptanes therein and finally completely melting the crystals of cyclohexane; continuously passing a portion of the melted cyclohexane toward said low temperature zone as a reflux; continuously introducing said isoheptane fraction as a feed into said liquid mixture at a point intermediate said zones so as to provide an essentially crystallization zone between said point and said low temperature zone and an essentially purification zone between said point and said high temperature zone; and continuously recovering liquid cyclohexane from said zone of relatively high temperature and liquid rich in said isoheptanes and lean in cyclohexane from said zone of relatively low temperature.

2. The process of claim 1 in which said feed is introduced to said liquid mixture at the temperature of the mixture at its point of introduction.

3. The continuous process for the separation and purification of a multicomponent organic mixture from which crystals containing at least two components of different melting points separate upon cooling, which comprises continuously introducing a liquid organic multicomponent feed mixture into a horizontally elongated separation and purification zone at a point intermediate the ends thereof; continuously maintaining by indirect heat-exchange a temperature in one end of said zone just above the melting point of the highest melting component of said mixture and a temperature at the other end of said zone at least as low as the solidification point of multicomponent crystals and above the solidification point of the entire mixture; continuously passing said liquid toward the low temperature end so as to form multicomponent crystals; continuously mechanically passing the crystals thus formed toward the high temperature end thereby gradually raising the temperature thereof and melting the lower melting components therefrom and finally completely melting said crystals; continuously passing a portion of the melted higher melting component toward said low temperature end in countercurrent flow to said crystals as a reflux; and continuously recovering liquid higher melting separated component from said high temperature end and liquor lean in said higher melting component from said low temperature end.

4. A continuous process for the separation and purification of a multicomponent organic mixture from which crystals containing at least two components of different melting points separate upon cooling, which comprises continuously introducing a liquid feed of said mixture into a vertically elongated zone at a point intermediate the ends thereof; continuously passing liquid mixture upwardly in said zone; maintaining by indirect heat exchange the upper end of said zone at a temperature at least as low as the solidification point of multicomponent crystals and above the solidification point of the entire mixture so as to form multicomponent crystals therein; maintaining by indirect heat-exchange the lower end of said zone just above the melting temperature of the highest melting component of said mixture; continuously moving said crystals downwardly through said zone countercurrent to said upwardly flowing mixture so as to gradually raise the temperature of said crystals and melt lower melting components therefrom thereby purifying and finally completely melting the highest melting component; continuously passing a portion of the melted highest melting component upwardly from the lower end of said zone as a reflux; and continuously recovering separated and purified component in liquid form from said high temperature end and liquor lean in said component from said low temperature end.

5. The process of claim 4 in which said feed is introduced at the temperature of said zone at the point of introduction.

6. A continuous process for the separation of para xylene from a mixture including ethylbenzene and ortho-, meta- and para xylene which comprises cooling a liquid mixture of said constituents so as to form multicomponent crystals containing para xylene suspended in a liquid mixture of said constituents; in an extended separation and purification zone in which opposite ends are maintained by indirect heat-exchange therein at temperatures above the melting point of para xylene and below the freezing point of multicomponent crystals but above the freezing point of the entire mixture, respectively, continuously passing the liquid mixture to the low temperature end and said crystals to the high temperature end of said zone so as to gradually increase the temperature of said crystals and melt the lower melting components therefrom and finally completely melt crystals of para xylene; continuously passing a portion of the melted para xylene toward the low temperature end of said zone as a reflux in countercurrent flow to said crystals; continuously recovering a liquid stream of said para xylene from said high temperature zone as a product of the process; continuously introducing a liquid feed comprising a mixture of said constituents at a point intermediate the ends of said zone so as to provide an essentially crystallization zone between said point and the low temperature end and an essentially purification zone between said point and the high temperature end of said zone; and withdrawing a liquid lean in para xylene from said low temperature end.

7. A continuous process for separation and purification of a liquid multicomponent organic system from which solid discrete particles containing at least two components of said system having different melting points separate upon lowering the temperature thereof, which comprises, continuously introducing said liquid system into an extended separation and purification zone intermediate the ends thereof; continuously maintaining by indirect heat-exchange a freezing section in one end of said zone at a temperature below the solidification point of said discrete particles but above the solidification point of the whole system so as to form discrete particles; continuously maintaining by indirect heat-exchange a melting section in the other end of said zone at a temperature just above the melting point of the highest melting component of said system; continuously mechanically moving the particles thus formed toward said melting section countercurrently to the flow of liquid so as to gradually increase the temperature of said particles and decrease the concentration of the lower melting components therein by melting and refluxing, thereby purifying the finally completely melting the higher melting component; continuously flowing liquid components in said zone toward said freezing section; continuously flowing a portion of the melted highest melting component from said melting section toward said freezing section as a reflux; and continuously recovering liquid purified highest melting component of said system from said melting section and liquor lean in said component from said freezing section.

8. A continuous process for the separation of a hydrocarbon from a mixture containing other hydrocarbons having lower melting points and from which multicomponent crystals including said hydrocarbon separate upon cooling, which comprises introducing said mixture into an extended separation zone at a point intermediate the ends thereof; maintaining by indirect heat-exchange a melting section in one end of said zone at the approximate melting point of said hydrocarbon and a freezing section in the other end thereof below the solidification point of said multicomponent crystals but above the solidification point of the entire mixture so as to form said crystals; continuously mechanically passing said crystals through said zone toward said melting section so as to gradually raise the temperature of said crystals and remove said other hydrocarbons by melting, and finally melting at least a portion of said hydrocarbon of highest melting point; continuously flowing said highest melting hydrocarbon from said melting section toward said freezing section as a reflux; continuously flowing the liquid fraction of said hydrocarbon mixture toward said freezing section in countercurrent flow to said crystals; and continuously recovering said hydrocarbon from said melting section and a hydrocarbon fraction lean in said hydrocarbon from said freezing section.

9. A continuous process for separation and purification of a binary liquid organic mixture of components having different melting points from which solid discrete particles containing both components separate upon cooling, which comprises introducing said liquid mixture at a temperature of imminent solid formation into an extended horizontal separation and purification zone intermediate the ends thereof; maintaining a freezing section in one end of said zone below the solid formation temperature of said particles but above the solidification point of the entire mixture by continuously extracting heat therefrom by indirect heat-exchange so as to form discrete particles in said freezing section; maintaining a melting section in the opposite end of said zone at the approximate melting temperature of the higher melting component of said mixture by continuously introducing heat thereto by indirect heat-exchange; gradually mechanically passing discrete particles formed in said zone toward said melting section and liquor toward said freezing section so as to melt the lower melting component from said particles and finally melt at least a portion of said higher melting component; continuously flowing a portion of said melted higher melting component from said melting section toward said freezing section as a reflux; continuously recovering higher melting component as a product from said melting section and a liquid lean in said higher melting component from said freezing section.

PHILIP M. ARNOLD.

REFERENCES CITED

The following references are of record in the file of this patent:

UNITED STATES PATENTS

| Number | Name | Date |
|---|---|---|
| 930,909 | Wiegand | Aug. 10, 1909 |
| 1,530,398 | Oliver | Mar. 17, 1925 |
| 1,880,925 | Eissner | Oct. 4, 1932 |
| 1,963,921 | Nagelvoort | June 19, 1934 |
| 2,147,222 | Treub | Feb. 14, 1939 |
| 2,194,185 | Padgett | Mar. 19, 1940 |
| 2,307,130 | Henry et al. | Jan. 5, 1943 |
| 2,322,438 | Henry et al. | June 22, 1943 |
| 2,348,329 | Cole et al. | May 9, 1944 |

OTHER REFERENCES

Perry, "Chemical Engineers' Handbook," second ed., pages 1782–1783. Published by McGraw-Hill, N. Y. (1941).